Feb. 21, 1939.  P. H. SADOWSKI  2,147,800
WORK HOLDER
Filed Jan. 8, 1937
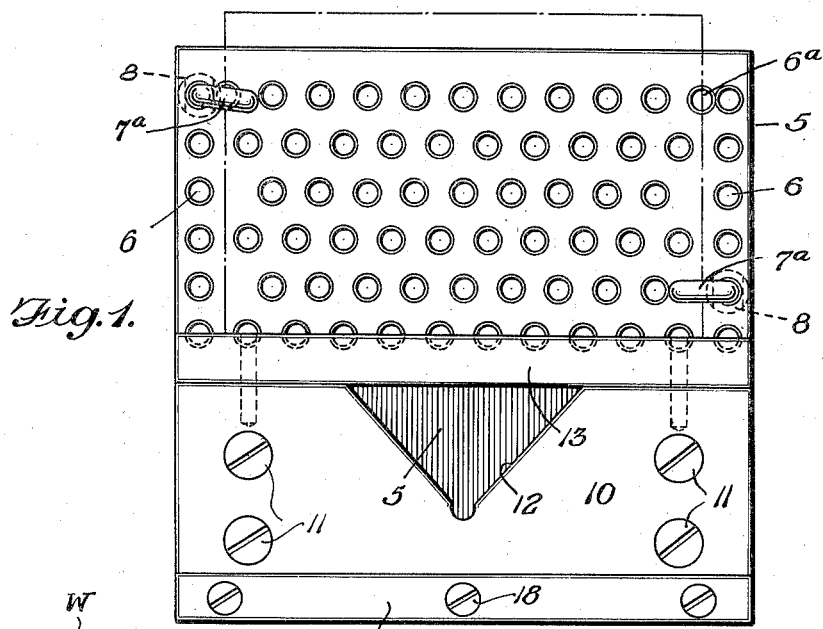
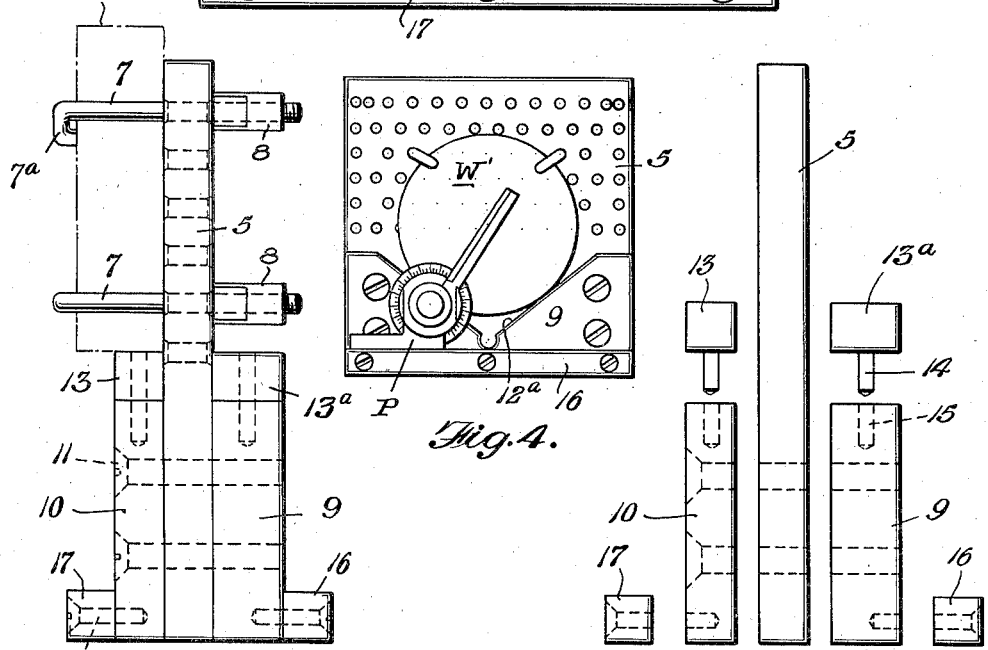
Inventor
P. H. Sadowski
By H. Yates Dowell
Attorney Patented Feb. 21, 1939

2,147,800

UNITED STATES PATENT OFFICE 2,147,800

WORK HOLDER

Paul H. Sadowski, Wilmington, Del.

Application January 8, 1937, Serial No. 119,669

2 Claims. (Cl. 33—189)

This invention relates to a work holder for use by tool makers and like craftsmen.

The invention includes among its objects: to provide a work holder which supports work in a manner rendering it convenient of access and which will accommodate itself to varying sizes and contours of work or pieces of material from which a tool or other object is to be made and wherein at the same time the work may be accurately laid out without shifting it from its initial clamped or set position on the holder; to provide a work holder for laying out work which is self-contained and is provided with means to facilitate the use of gages and like measuring instruments; to provide a device of this character which is compact and convenient to handle and which may be constructed at a relatively low cost.

With the foregoing and other objects and advantages in view, the invention consists in the preferred construction and arrangement of the several parts which will be more fully hereinafter described and claimed.

In the drawing:

Fig. 1 is a view in side elevation of a work holder constructed in accordance with the features of the present invention, a piece of work or material being clamped in the holder on the side facing the observer.

Fig. 2 is a view in edge elevation thereof.

Fig. 3 is a view similar to Fig. 2 but with the parts disassembled.

Fig. 4 is a view in reduced side elevation of the work holder, showing the side opposite to that of Fig. 1 with a piece of round work or material held therein.

The improved work holder, in its preferred form, comprises a clamping or work-holding plate 5 which is formed with a plurality of countersunk holes 6 adapted to receive clamps 7. The construction of the clamps is best shown in Fig. 2, the shank portions thereof being passed through the holes 6 and secured in position by means of adjusting nuts 8. The outer ends of the clamps 7 are formed with hooks 7a adapted to engage over the work. The nuts 8 preferably have flattended portions to facilitate gripping and to avoid projecting beyond the edges of the plate when the tool is laid on its edge.

The holes 6 are preferably arranged in alignment diagonally and in staggered relation vertically with the last row of holes at opposite sides of the plate arranged in a row vertically. Also an additional hole 6a is preferably formed at each side of the block adjacent the last row of holes or to one of the latter. By this arrangement, a relatively fine adjustment or high degree of accuracy is obtained for setting the clamps 7.

Blocks 9 and 10 are removably secured on opposite sides of the plate 5 by means of screws 11. The blocks 9 and 10 are respectively provided with substantially V-shaped work-receiving notches 12 and 12a, which automatically adapt the blocks to varying diameters or work, note particularly Figs. 1 and 4. Thus these blocks constitute additional work-holding members which cooperate with plate 5. These notches are preferably of varying dimensions to accommodate a greater range of work diameters, notch 12a being shown as adapted for larger sizes of work than notch 12.

Detachably mounted on the upper edge surface of each of the blocks 9 and 10 are supporting members or bars 13 and 13a formed with projecting pins or the like 14 adapted to engage in holes 15 formed in each of the blocks 9 and 10. These supporting bars or members 13 and 13a are generally used in the case of flat sided work. However, in certain instances they may be used as a support for a gauge or other measuring instrument.

Base members 16 and 17 complete the assembly and are adapted to be detachably secured to the opposite sides of the blocks 9 and 10 by means of screws 18. These bars 16 and 17 provide a stable support for the layout tool or work holder.

The work holder as shown is square or has its adjacent sides formed at right angles each other, so that it may be turned on any side desired in laying out work. In Figs. 1 and 2, a flat piece of work W is shown in the holder, and in this instance the bars 13 and 13a are used. In Fig. 4 a round piece of work is illustrated at W', in which instance the side member 13a is removed and the work supported directly in the notch 12a. This notch like notch 12 not only accommodates varying diameters of work or material, but it also renders the work more accessible. In Fig. 4 a protractor P is shown simply for the purpose of illustration and to demonstrate how the lower base members 6 may serve as a support for a measuring instrument or device. The work can be clamped on either side of the plate 5. The notched block 9 is preferably made of a greater width than the block 10. Practically any type or shape of work can be laid out complete without shifting the work in the holder until the job is finished. For example, the work may be first laid out from the base of the tool or holder, and then the latter turned over on either side to lay out parallel and vertical lines.

It will be understood that the size of the work holder may be varied to meet conditions. For example, in handling large work, the size of the tool may be greatly increase and in some instances, it may be desirable to clamp or otherwise secure the entire tool in place. Where the work is small, the size shown in the drawing is suitable. However, since the plate 5 accommodates itself to varying sizes of work, one tool will accommodate a wide range of work.

It will be understood that other minor changes in construction and design may be adopted within the province of the invention as defined by the appended claims.

I claim:

1. A work holder comprising a work supporting plate having a flat surface, clamps for securing work against said flat surface, said plate having flat smooth edge surfaces so that it may rest firmly in upright position on its edge when in use, a flat faced work supporting block secured against one side of said plate and having a substantially V-shaped work engaging notch therein presented toward the work supporting plate to thereby provide a unitary work holder for both flat and round work, the height of the work supporting block being of such proportion as to leave the major part of the work support unobstructed for receiving work, said block having its lower edge extending substantially flush with the lower edge of the work supporting plate and forming therewith a relatively wide flat base thereby providing a stable support for the work.

2. A work holder comprising a normally upright work supporting plate, clamping means for fastening a piece of work adjustably against said plate, a flat faced work supporting block detachably secured against one side of said plate, said block having its upper edge constructed for intimate engagement with the work clamped thereagainst by said clamping means, and the block being of a height to leave the major portion of the work support unobstructed for receiving work, said block having its lower edge terminating substantially flush with the lower edge of the work supporting plate and forming therewith a relatively wide flat base thereby providing a stable support for the work.

PAUL H. SADOWSKI.